June 23, 1959  A. W. SEYFRIED ET AL  2,891,745
PORTABLE FOOD MIXER AND SUPPORT
Filed April 2, 1956  2 Sheets-Sheet 1

INVENTORS.
ARTHUR W. SEYFRIED
PETER W. LAHR
BY Bertha L. MacGregor
ATTORNEY

June 23, 1959  A. W. SEYFRIED ET AL  2,891,745
PORTABLE FOOD MIXER AND SUPPORT
Filed April 2, 1956  2 Sheets-Sheet 2

INVENTORS.
ARTHUR W. SEYFRIED
PETER W. LAHR
BY Bertha L. McGregor
ATTORNEY

United States Patent Office 2,891,745
Patented June 23, 1959

2,891,745

PORTABLE FOOD MIXER AND SUPPORT

Arthur W. Seyfried and Peter W. Lahr, Racine, Wis., assignors to Scovill Manufacturing Company, Waterbury, Conn., a corporation of Connecticut Application April 2, 1956, Serial No. 575,380

9 Claims. (Cl. 248—13)

This invention relates to a portable food mixer and support, and more particularly to means for mounting the motor unit on a standard and for preventing automatic movement of the motor longitudinally of the arm while the mixer is being operated.

The embodiment of our invention shown and described herein is an improvement on the portable food mixer and support of U.S. Patent No. 1,970,811, which comprises a base, an arm on the base having an upwardly inclined bearing surface on its end, a portable motor and depending agitator, the motor being provided with a surface inclined downwardly from that end of the motor carrying the agitator, said inclined surface being adapted to bear slidingly on the inclined end of the arm. The inclination of the engaging surfaces is such that the motor is supported in horizontal position. The power unit of the food mixer described in said patent is positioned by a sliding rearward movement on the support and automatically seats itself without the aid of fastening means. Removal of the motor unit is achieved by sliding the unit forwardly on the support. The patented construction has proven efficient for most mixing operations, but when used for mixing heavy batters or dough, the motor tends to be pulled forwardly by the action of the beaters on the bowl contents, and there is danger of the power unit becoming disengaged from its seat.

To prevent unintended disengagement of portable mixers and their supports, various locking devices operated by levers or buttons have been used to hold prior art mixers on their standards, but the devices in use for this purposes are objectionable because they require manipulation and the use of two hands to actuate the locking means, both for retaining the motor on its support and for permitting removal of the motor from the support.

The main object of our invention is to provide means for seating the mixer on its support and simultaneously automatically actuating a latching device to retain the motor on the support and to prevent movement of the motor relatively to the support while the said parts are in their normal operative position.

Another object of our invention is to provide a latching device of the character described which is automatically actuated to be disengaged from the mixer when the mixer and support are tilted rearwardly, thus permitting the motor to be disengaged from the tilted support.

The seating of the motor driven mixer on the support which automatically actuates the latching mechanism, the tilting of the engaged mixer and support rearwardly which automatically disengages the latching device from the mixer, followed by manual removal of the mixer from its support, can be achieved by the use of only one hand grasping the mixer handle, and without any manipulation of the latching device.

It will be understood that while we have shown latching mechanism embodying our invention as mounted in a food mixer having its motor slidingly mounted on an inclined support, such as shown in U.S. Patent No. 1,970,811, the use of our latching mechanism is not confined to the particular construction shown in said patent, and may be embodied in other types of mixers in which the motor unit is detachably supported on a support which can be tilted relatively to its normal operating position.

The advantages of the invention will be apparent from the drawings and following description.

Figure 4:
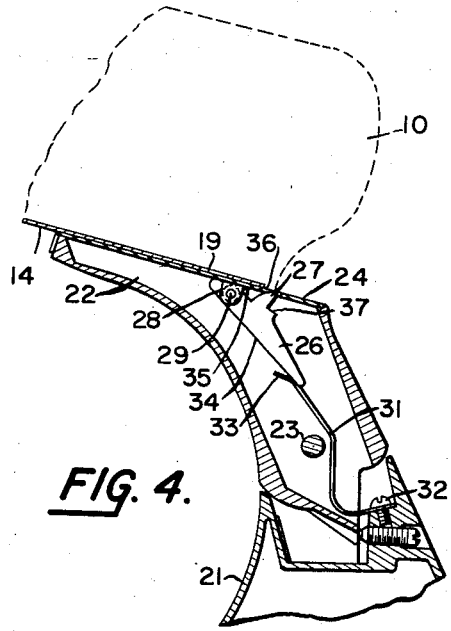
Fig. 4 is a vertical longitudinal sectional view of the upper portion of the support, in its normal operative position, showing in dotted lines the rearward portion of the mixer as it is slidably moved rearwardly on the support to seat it in its normal operative position, the latching device in the support being forced downwardly and rearwardly by the sliding movement of the mixer.
Figure 5:
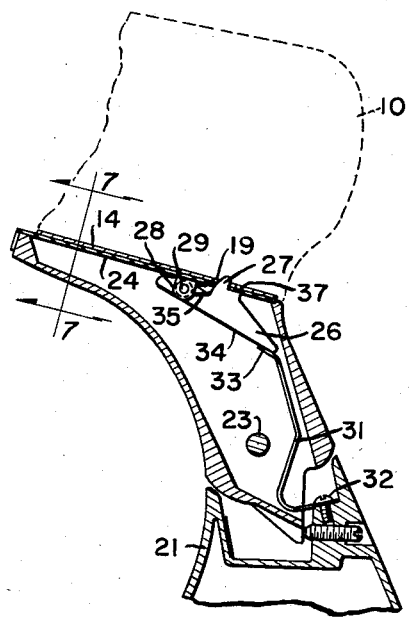
Fig. 5 is a view similar to Fig. 4 showing in dotted lines the rearward portion of the mixer seated on its support, with the latching device engaging the mixer and preventing relative movement of the engaged parts.
Figure 6:
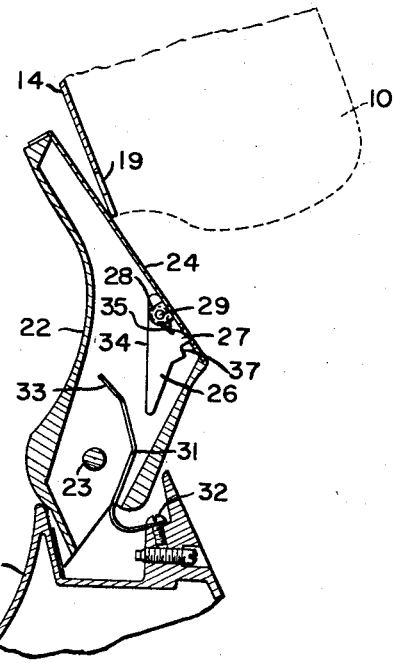

Fig. 6 is a vertical longitudinal sectional view of the parts shown in Figs. 4 and 5, showing the upper portion of the support tilted rearwardly relatively to the base portion, whereby the latching mechanism in the support is automatically actuated to depress the latch and to disengage it from the mixer, permitting removal of the mixer from the support by sliding movement in a forward direction, as indicated by the dotted line position of the mixer.

Figure 7:
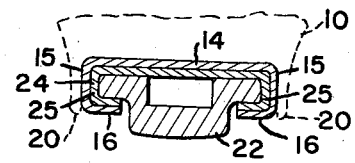

Fig. 7 is a transverse sectional view taken in the plane of the line 7—7 of Fig. 5.

Figure 1:
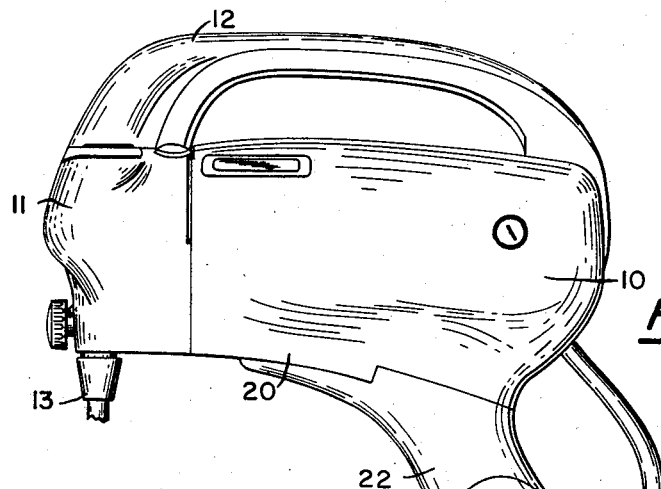
Fig. 1 is an elevational side view of a portable food mixer and support embodying our invention, with the agitator and lower portion of the support broken away.
Figure 3:
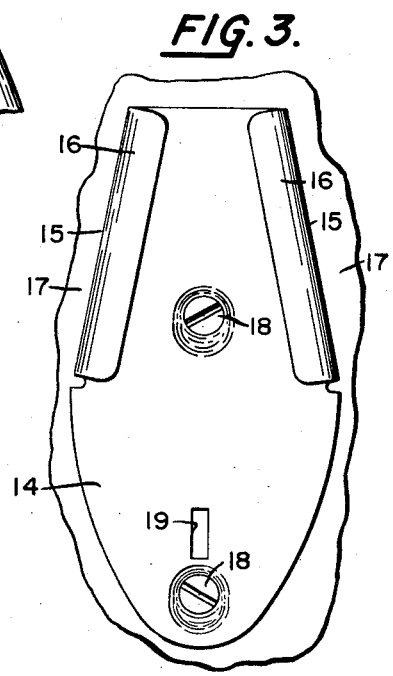
Fig. 3 is a bottom plan view of part of the mixer, showing the flanged plate which engages the support when the mixer is seated thereon.

In the preferred embodiment of our invention shown in the drawings, the mixer comprises a motor and housing 10, gear casing 11, handle 12 secured to the housing 10 and casing 11, and an agitator 13 depending from the forward end of the mixer. On its lower surface, the motor housing 10 has secured to it a plate 14 shown in Fig. 3. The plate is flat and shaped as shown to conform to the rounded rearward end of the motor housing, with the forward portions 15 of the side margins converging toward the front of the mixer. The side margins are integrally provided with flanges 16 which extend downwardly and inwardly as shown in Figs. 3 and 7. The surface 17 of the motor housing to which the plate 14 is secured by screws 18 is inclined downwardly from front to rear and the plate 14 is similarly inclined when fixed in its intended position on the mixer bottom. The slot 19 in the rearward portion of the plate 14 registers with a recess in the bottom of the housing 10 for reception of the latching device hereinafter described. The side walls of the motor housing 10 are shaped to conceal the flanges 16, as indicated at 20 in Fig. 1.

Figure 2:
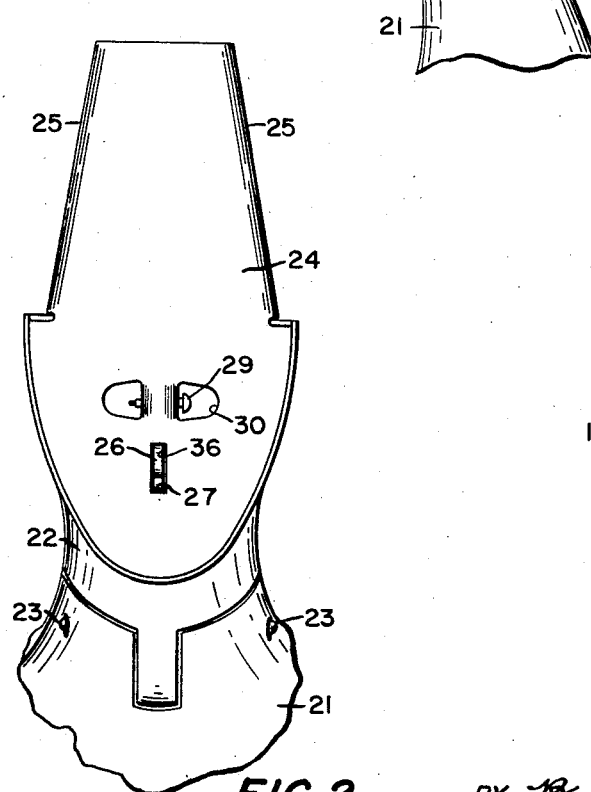
Fig. 2 is a top plan view of the upper portion of the mixer support.

The support on which the mixer unit rests comprises a flat base (not shown) from which rises a cast standard, part of which is shown in the drawings and indicated at 21. The upper part of the support is in the form of an inclined overhanging arm 22 pivotally connected to the standard 21 by a pin 23. The top of the arm 22 conforms in shape to the plate 14 on the mixer, and is covered by a metal plate 24 which extends over the top of the arm as shown in Fig. 2, and is flanged to extend downwardly and inwardly as indicated at 25 in Fig. 7. The forward portion of the arm 22 and attached plate 24 fit within the flanged portion of the plate 14.

The overhanging arm 22 is hollow as shown in Figs. 4, 5 and 6, and has mounted therein the latching mechanism for retaining the mixer unit on the arm. The mechanism comprises a lever 26 provided with a detent 27 projecting from one of its longitudinal edges, the lever being mounted between a pair of ears 28 by a pivot pin or screw 29. Preferably the ears 28 are formed by cutting the plate 24 as indicated at 30 in Fig. 2, and turning the cut members downwardly. A spring 31 made of flat metal and shaped as shown, is attached at one end to the lower standard member 21 by a screw 32. The opposite free end 33 of the spring 31 bears against the flat edge 34 of the lever 26, normally urging the lever into the position shown in Fig. 5, against the tension of the weak coiled spring 35 mounted on the pivot 29 to bear on the lever 26 adjacent the detent 27. In this position of the lever 26, the detent projects upwardly through the slot 36 as shown in Figs. 2 and 5, with the shoulder 37 adjacent the detent bearing against the under side of the plate 24. The lever 26 is maintained in the position shown in Fig. 5 when the overhanging arm 22 in its normal operative position, and if the motor 10 is in position on the arm, the detent 27 engages the recessed housing 10 and plate 14 of the motor through the slot 19.

As shown in Fig. 4, the mixer motor 10 is being seated on the inclined plate 24 on the arm 22 by a rearwardly sliding movement, the flanges 16 engaging the edges 25 of the plate 24. As the rearward lower edge of the motor 10 contacts the upwardly projecting detent 27, the detent is yieldingly forced downwardly through the slot 36 into the hollow arm 22. As soon as the mixer unit has reached the end of the sliding movement and become completely seated on the overhanging arm 22, as shown in Fig. 5, the detent 27 under influence of the spring 31 is urged upwardly through the slot 36 into engagement with the motor 10 through the slot 19 in plate 14. In this position the mixer cannot be removed from the arm, and relative movement between the mixer and arm is prevented.

To permit removal of the mixer from the arm 22, it is necessary to tilt the arm 22, with the mixer mounted thereon, on the pivot 23. As shown in Fig. 6, when the arm 22 is in its rearwardly tilted position, the spring 31 is disengaged from the lever 26 and then the coiled spring 35 bearing on the detent edge of the lever causes the lever to move pivotally to withdraw the detent 27 from the slot 36. In this position, the mixer 10 can be moved slidably forwardly without hindrance by the detent 27, and when the flanges 16 have moved forwardly sufficiently to disengage the edges 25 of the plate 24, the mixer can be lifted off the support.

From the foregoing it will be apparent that whenever the arm 22 is in normal operative position (Figs. 1, 4 and 5), the mixer will be retained thereon by the detent 27. The mixer can be removed only when the supporting arm 22 has been tilted rearwardly as shown in Fig. 6.

The mixer is seated on its support and retained thereon automatically by the mere sliding movement placement of the motor on the arm 22, and is automatically released for removal by a sliding movement in the reverse direction by merely tilting the arm 22 carrying the mixer. All this is achieved without manipulation of any fastening or locking means.

In describing the invention, reference has been made to a particular example embodying the same, but we wish it to be understood that the invention is not limited to the construction shown in the drawing, that the latching mechanism may be applied to tools other than food mixers, and that various changes may be made in the construction and general arrangement of parts without departing from the invention.

We claim:

1. A portable mixer and support comprising a portable motor, a support including a standard, a hollow overhanging arm, means pivotally connecting the arm to the standard, and latching means mounted in the arm, the motor being provided with a lower surface adapted to seat on the arm, said latching means comprising a motor engaging lever pivotally mounted in the hollow arm, first lever bearing means urging the lever into motor engaging position when the motor is seated on the arm and the arm is in normal operative position, and second lever bearing means urging the lever into motor disengaging position when the arm has been moved pivotally out of normal operative position, said first lever bearing means being automatically released from bearing contact with the lever by said arm being moved pivotally out of normal operative position.

2. A portable mixer and support comprising a portable motor, a support including a standard, a hollow overhanging arm having a downwardly and rearwardly inclined bearing surface, means pivotally connecting the arm to the standard, and latching means mounted in the arm, the motor being provided with an inclined lower surface adapted to bear on the inclined surface of the overhanging arm to support the motor in horizontal position, said latching means comprising a motor engaging lever pivotally mounted in the hollow arm, first lever bearing means urging the lever into motor engaging position when the motor is seated on the arm and the arm is in normal operative position, and second lever bearing means urging the lever into motor disengaging position when the arm has been moved pivotally out of normal operative position, said first lever bearing means being automatically released from bearing contact with the lever by said arm being moved pivotally out of normal operative position.

3. A portable mixer and support comprising a portable motor, a support including a standard, a hollow overhanging arm having a downwardly and rearwardly inclined bearing surface, the side margins of the forward end of the arm converging, means pivotally connecting the arm to the standard, the motor being provided with an inclined lower surface adapted to bear on the inclined surface of the overhanging arm, a pair of flanges depending from said inclined motor surface for sliding engagement with the converging side margins of the arm, and latching means mounted in the arm rearwardly of said converging side margins, said latching means comprising a motor engaging lever pivotally mounted in the hollow arm, first lever bearing means urging the lever into motor engaging position when the motor is seated on the arm and the arm is in normal operative position, and second lever bearing means urging the lever into motor disengaging position when the arm has been moved pivotally out of normal operative position, said first lever bearing means being automatically released from bearing contact with the lever by said arm being moved pivotally out of normal operative position.

4. A portable mixer and support comprising a portable motor, a support including a standard, a hollow overhanging arm, means pivotally connecting the arm to the standard, and latching means mounted in the arm, the motor being provided with a lower surface adapted to seat on the arm, said latching means comprising a lever pivotally mounted in the arm, a detent on the lever, a slot in the arm through which said detent projects when the arm is in normal operative position, a spring mounted in the standard having a free end bearing on the lever and urging it into detent projecting position, and a spring mounted in the arm bearing on the lever and urging it into detent withdrawing position, said first mentioned spring being out of lever bearing position when the arm has been moved pivotally out of normal operative position.

5. A portable mixer and support comprising a portable motor, a support including a standard, a hollow overhanging arm having a downwardly and rearwardly inclined bearing surface, means pivotally connecting the arm to the standard, and latching means mounted in the arm, the motor being provided with an inclined lower surface adapted to bear on the inclined surface of the overhanging arm to support the motor in horizontal position, said latching means comprising a lever pivotally mounted in the arm, a detent on the lever, a slot in the arm through which said detent projects when the arm is in normal operative position, a spring mounted in the standard having a free end bearing on the lever and urging it into detent projecting position, and a spring mounted in the arm bearing on the lever and urging it into detent withdrawing position, said first mentioned spring being out of lever bearing position when the arm has been moved pivotally out of normal operative position.

6. A portable mixer and support comprising a portable motor, a support including a standard, a hollow overhanging arm, means pivotally connecting the arm to the standard, and latching means mounted in the arm, the motor being provided with a lower surface adapted to seat on the arm and having a downwardly opening recess in said surface, said latching means comprising a motor engaging member pivotally mounted in the arm, a slot in the arm which registers with the recess in the motor when the motor is seated on the arm, means automatically moving the motor engaging means through the slot in the arm into the motor recess when the arm is in its normal operative position, and means automatically withdrawing the motor engaging means into the arm when the arm has been tilted rearwardly out of its normal operative position.

7. A portable mixer and support comprising a portable motor, a support including a standard, a hollow overhanging arm, means pivotally connecting the arm to the standard, and latching means mounted in the arm, the motor being provided with a lower surface adapted to seat on the arm and having a downwardly opening recess in said surface, said latching means comprising a lever pivotally mounted in the arm, a detent on the lever, a slot in the arm which registers with the recess in the motor when the motor is seated on the arm, a spring mounted in the standard having a free end bearing on the lever and urging it into detent projecting position, and a spring mounted in the arm bearing on the lever and urging it into detent withdrawing position, said first mentioned spring being out of lever bearing position when the arm has been moved pivotally out of normal operative position.

8. A portable mixer and support comprising a portable motor, a support including a standard, a hollow overhanging arm, means pivotally connecting the arm to the standard, a motor bearing plate on top of the arm, a pair of spaced apart ears depending from the plate into the arm, latching means pivotally secured to said ears, the motor being provided with a lower surface adapted to seat on the arm and having a downwardly opening recess in said surface, said latching means comprising a motor engaging member, a slot in the plate which registers with the recess in the motor when the motor is seated on the arm, means automatically moving the motor engaging means into the motor recess through said slot in the arm when the arm is in its normal operative position, and means automatically withdrawing the motor engaging means into the arm when the arm is tilted rearwardly out of its normal operative position.

9. A portable mixer and support comprising a portable motor, a support including a standard, a hollow overhanging arm, means pivotally connecting the arm to the standard, a motor bearing plate on top of the arm, a pair of spaced apart ears depending from the plate into the arm, the motor being provided with a lower surface adapted to seat on the arm and having a downwardly opening recess in said surface, and latching means comprising a lever, means pivotally connecting the lever to said depending ears, a detent on the lever, a slot in the plate which registers with the recess in the motor when the motor is seated on the arm, a spring connected to the standard having a free end bearing on the lever and urging the detent to project through the slot in the plate into the motor recess when the arm is in its normal operative position, and a spring mounted on the lever and ear connecting means bearing on the lever and automatically urging the lever into detent withdrawing position, said first mentioned spring being out of lever bearing position when the arm is moved pivotally out of normal operative position.

References Cited in the file of this patent

UNITED STATES PATENTS

| | | |
|---|---|---|
| 2,326,996 | Fuge | Aug. 17, 1943 |
| 2,682,854 | Cohen | July 6, 1954 |